Aug. 13, 1968         M. F. WALKER         3,396,594
ANTI-BACKLASH MEANS FOR GEAR TRAINS
Filed Feb. 25, 1966                2 Sheets-Sheet 1
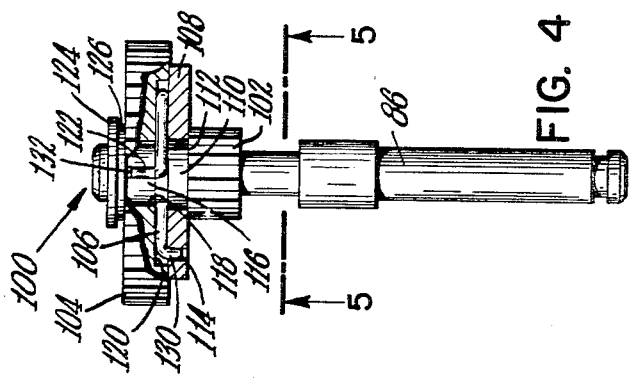
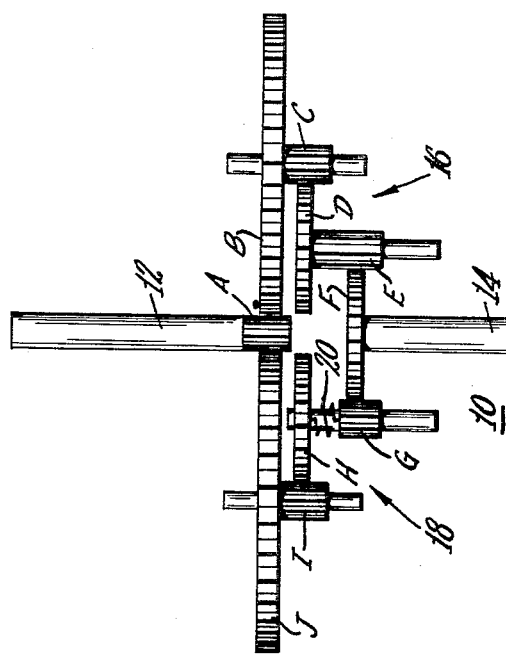
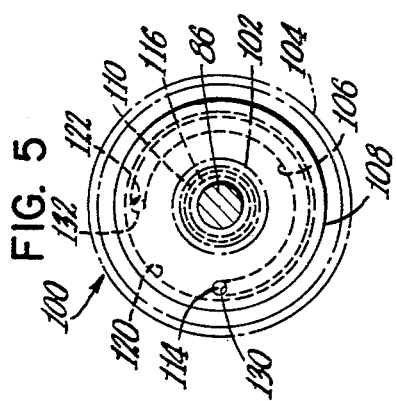
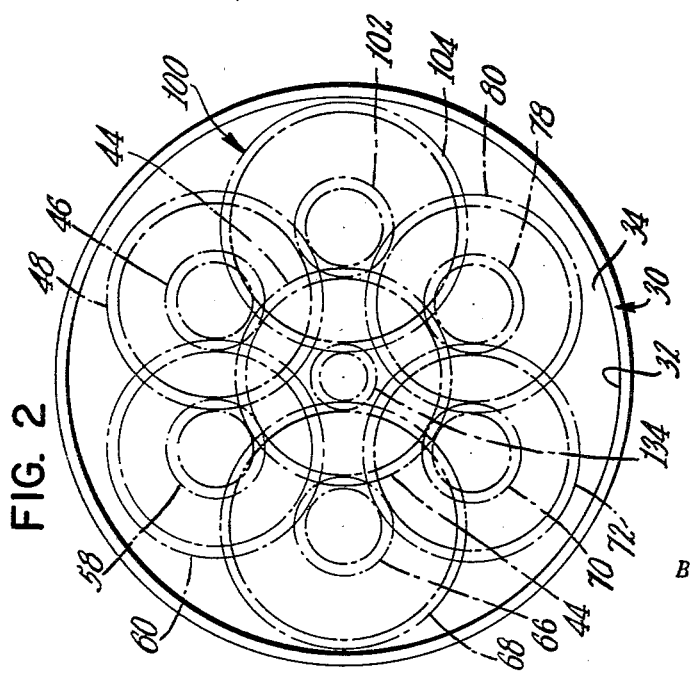
INVENTOR.
MELVIN F. WALKER
BY Leonard H. King
ATTORNEY

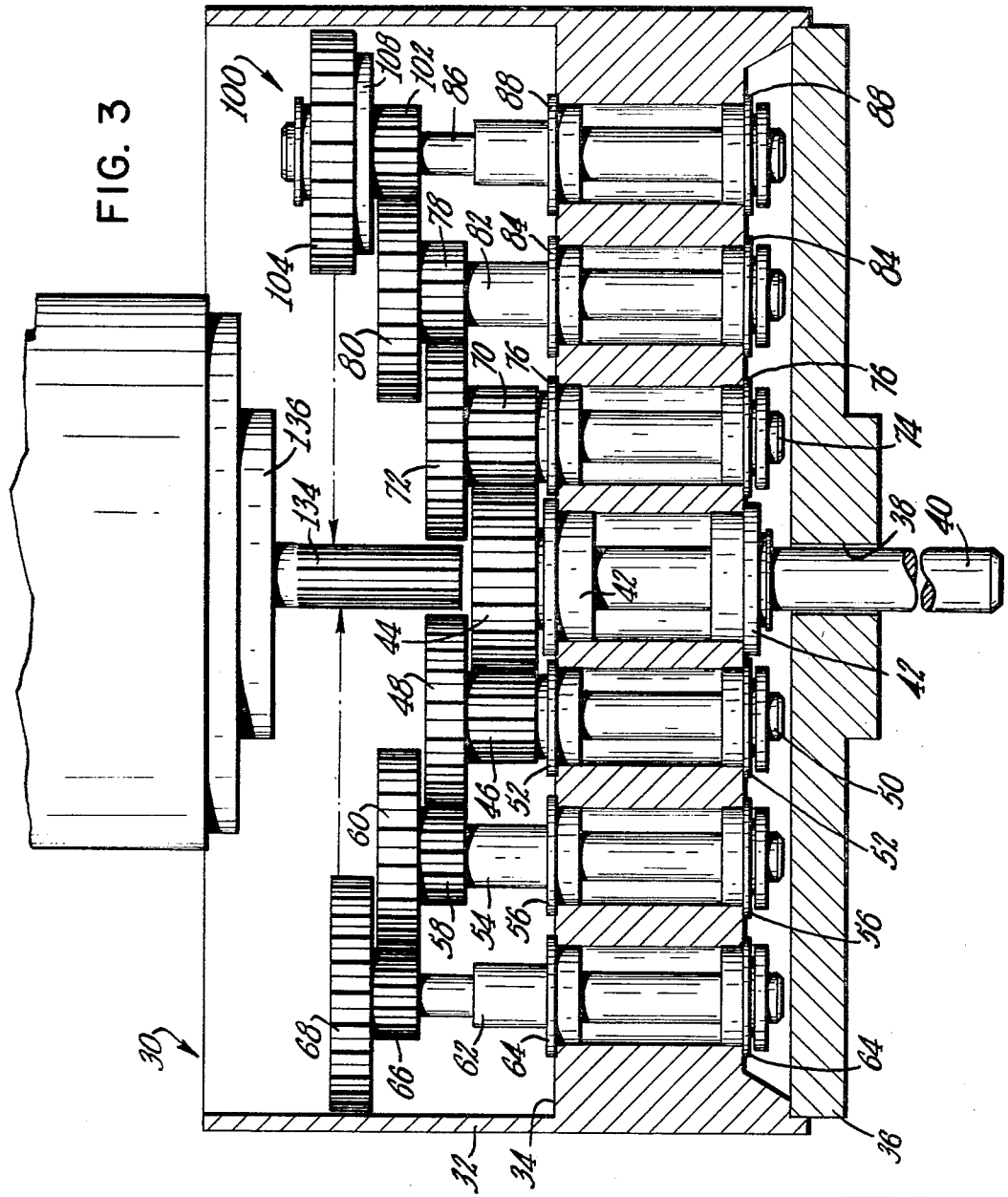

United States Patent Office 3,396,594
Patented Aug. 13, 1968

3,396,594
ANTI-BACKLASH MEANS FOR GEAR TRAINS
Melvin F. Walker, Deer Park, N.Y., assignor to
Designatronics, Inc., Mineola, N.Y.
Filed Feb. 25, 1966, Ser. No. 530,113
10 Claims. (Cl. 74—409)

ABSTRACT OF THE DISCLOSURE

A high ratio precision gear train having a dual gear train, one of which is spring-loaded for elimination of backlash.

---

This invention relates generally to gear trains and in particular to improved anti-backlash means therefor.

Many electromechanical instruments can operate at peak efficiency only when driven at a particular, prescribed speed. Where the driving force rotates at a different rate, means such as a gear train may be utilized to provide the appropriate ratio between input and output speeds. A gear train comprised of conventional spur gears is more than adequate for this purpose except where extreme accuracy is required at the output end. Because the tolerances used in the manufacture and assembly of the gear train creates errors during power transmission, anti-backlash means must be included to eliminate the most common source of error where accuracy of the instruments is of vital importance. By definition backlash is the play between mating teeth of two adjacent gears.

The present invention provides improved anti-backlash means in a spur gear arrangement that may be utilized as a gearhead, a speed reducer or a speed increaser. Basically the anti-backlash system is comprised of two substantially identical gear trains that use common input and output gears. The input and output shafts are functionally interchangeable. One of the two shafts is connected to the high speed portion of the system while the other shaft is connected to the low speed portion of the system.

In combination, the two gear trains define a closed loop system. One of the gear trains is conventional. The gear train that makes up the other half of the closed loop is resilient. As a prerequisite to proper functioning one pinion and one gear are common to both halves of the entire anti-backlash system. In the resilient half of the system there is included one gear that is rotatable with respect to the shaft on which it is mounted and with respect to a pinion rigidly secured to the same shaft. Biasing means connect the gear and pinion so that one element can be angularly displaced relative to the other. Displacement of one element tends to load the biasing means which in turn produces a reactionary force tending to return both elements to their original relative positions. By placing the resilient gear set into the train in the loaded condition in a manner to be explained later, the resilient half of the loop is completed and the reactionary forces remove all backlash from both halves of the gear train.

Advantages and features of this invention, in comparison to other anti-backlash systems, include the following:

(1) High gear train efficiency coupled with low starting and running torques.

(2) The same side of all teeth are loaded regardless of the direction of rotation of the system.

(3) Low indexing errors are encountered since only one-half of the profile error is acting.

(4) Errors in the two co-rotating halves of the closed loop system tend to counteract each other.

(5) Since the tooth loading is always in the same direction the loads on the support bearings will remain relatively constant in both magnitude and direction.

(6) Since only one gear in the present system is resiliently mounted, in contrast to several gears in prior art systems, the error from this source is only 1/N of the error in a conventional, scissors-type anti-backlash system, where N equals the number of anti-backlash gears normally employed.

(7) In a speed reducer application, where the resilient gear set is located at or near the input gear, the effective resilient anti-backlash force is multiplied by the gear ratio.

(8) When the resilient gear set is located at or near the output gear, the effective, resilient anti-backlash force is substantially equal to the resilient force of the biasing means.

(9) High anti-backlash forces are available either as a speed increaser or speed decreaser.

(10) The instant invention provides a system for minimizing indexing errors caused by tooth profile errors and tooth-to-tooth composite error.

(11) The instant invention provides a system for applying a relatively constant load to the bearings, thereby increasing bearing life and improving positional accuracy.

(12) The present invention provides a multipass anti-backlash gear train with only one resiliently biased gear set.

Accordingly, it is the primary object of the invention to provide an improved anti-backlash spur gear system that incorporates, both individually and in various combinations, all of the above-mentioned advantages and features.

These and other objects, features and advantages of the invention will, in part, be pointed out with particularity and will, in part, become obvious from the following more detailed description of the invention, taken in conjunction with the accompanying drawings which form an integral part thereof.

In the various figures of the drawing like reference characters designate like parts.

In the drawing:

FIG. 1 is a schematic illustration of one embodiment of this invention;

FIG. 2 is a sectional plan view of a typical gearhead assembly using the anti-backlash system comprising the present invention;

FIG. 3 is a developed elevational view in section of the components of FIG. 2;

FIG. 4 is an enlarged sectional elevational view of the resilient gear set used in the instant invention; and FIG. 5 is a transverse sectional view taken along line 5—5 of FIG. 4.

The novelty of this invention may be understood by reference at this time to FIG. 1 of the drawing. A resilient closed loop anti-backlash system is designated by the reference character 10. In this particular embodiment shaft 12 is connected to the high speed portion of the system while shaft 14 is connected to the low speed portion of the system. However, the two shafts 12 and 14 may be interchangeably used as input and output shafts.

Anti-backlash system 10 is defined by two distinctly separate but substantially identical gear trains having two common elements. The first gear train 16, which is conventional, is comprised of pinion A integral with one end of shaft 12, gear B, pinion C integrally rotatable with gear B, gear D, pinion E integrally rotatable with gear D and gear F integral with the end of shaft 14. Shafts 12 and 14 are co-axially opposed to each other.

The second gear train 18 is resilient in nature and provides the anti-backlash characteristics of the closed loop gear system. Gear train 18 is comprised of pinion A, integral with one end of shaft 12, gear J, pinion I integrally rotatable with gear J, gear H, pinion G independently rotatable and biased with respect to gear H and gear F integral with the end of shaft 14. It is to be noted as both a feature and requisite of this invention that pinion A and gear F are common to both the conventional and resilient halves of the anti-backlash system as a whole.

Gear H and pinion G are mounted on the same shaft. Gear H is loosely mounted and freely rotatable within the limits imposed by biasing means 20 while pinion G is rigidly secured. By way of illustration, biasing means 20 is shown as a helical torsion spring. However, other forms of biasing means such as an extension spring, a compression spring, a torsion bar, etc., could be used and would operate at least as efficiently. While the exact placement of gear H, pinion G, the shaft on which they are both mounted and the biasing means acting thereon may be varied, it is advantageous to locate them as close as possible to the high speed end of the anti-backlash system. This assures maximum utility of the torsional restorative forces of the biasing means.

FIGS. 2 and 3 illustrate the application of the present invention as a gear head 30. It should be noted that FIG. 3 is a developed view. Housing 32 is provided with a base wall 34 in which substantially all of the components are mounted in cantilevered fashion. Plate 36, having a central aperture 38, covers the base wall. Considering now the conventional gear train half of the closed loop system, it will be seen that shaft 40, rotatably journalled in the base wall on bearings 42, supports a gear 44 at one end thereof. Pnion 46 and gear 48 are integral with shaft 50 which is rotatably journalled in the base wall on bearings 52. Pinion 46 is in meshing engagement with gear 44.

Shaft 54 is also rotatably journalled in the base plate 34 on bearings 56 and integrally carries pinion 58 and gear 60 at one end. Pinion 58 is in meshing engagement with gear 48. Still another shaft 62 is rotatably journalled in the base plate on bearings 64 whereby pinion 66, integral with the shaft, is in meshing engagement with gear 60. Gear 68 is also carried by shaft 62. The foregoing completes the description of the conventional gear train half of the closed loop system.

The resilient half of the closed loop system will now be considered. For convenience, the description will be started at the same place as that of the first half, although it is to be understood that the anti-backlash gear system is continuous. Pinion 70 and gear 72 are rigidly secured to shaft 74 which is rotatably journalled on bearings 76 in the base wall. Pinion 70 is meshingly engaged with common gear 44 while gear 72 is in mesh with a pinion 78. Gear 80 as well as pinion 78 is integral with a shaft 82 that is rotatably journalled on bearings 84 in the base wall.

The final gear set, but not the last element in the train, is supported on a shaft 86 that is rotatably journalled on bearings 88 in the base wall. Gear set 100 is comprised of a pinion 102 that is integral with shaft 86 and which is in engagement with gear 80. Gear set 100 also includes a gear 104 rotatably mounted on shaft 86, a biasing member 106 acting on gear 104 and anchoring means 108 for one end of the biasing member.

Reference may be had to FIG. 4 and FIG. 5 for a full understanding of the construction of gear set 100. In the example of the invention shown in the drawing it will be seen that pinion 102 is integrally formed on shaft 86 and is provided with a stepped down diameter 110. Anchoring means 108, in the form of a disc or washer type element, is provided with a central aperture 112 that may be press fit or otherwise suitably secured on shaft diameter 110. Disc 108 further includes an aperture 114 in the face thereof that opposes gear 104. Aperture 114 receives one end of biasing means 106 in a manner to be described more fully hereinafter.

Shaft 86 includes still another stepped down diameter 116 that is contiguous with diameter 110 and arranged to be inserted for free rotation in a central aperture 118 in gear 104. Free running of gear 104 with respect to pinion 102 is thereby assured. Gear 104 is further provided with a recess 120 and an aperture 122, both of the last mentioned items being formed in the face of gear 104 that opposes disc 108. Recess 120 receives the body portion of the biasing means and aperture 122 receives the opposite end of the biasing means. Finally, gear 104, biasing means 106 and disc 108 are axially retained on the shaft by means of a retaining ring 124 and optionally a shim or shims 126 if it is necessary to remove end play. This arrangement may conveniently be used at both ends of each shaft in the system. It will be seen then that gear 104 is angularly displaceable with respect to pinion 102 under the urging of and within the limits imposed by the biasing means which will now be described in detail.

In the embodiment illustrated biasing means 106 is a length of 0.024″ diameter music wire formed in an arc of approximately 270° and adapted to be seated in recess 120 of gear 104. Body portion 128 of the biasing means at least partially encircles a portion of shaft diameter 116. Ends 130 and 132 of the biasing means are oppositely bent into planes approximately that of the longitudinal axis of shaft 86 with end 130 arranged to enter aperture 114 and end 132 arranged to enter aperture 122. While a helical torsion producing member has been shown, the invention should, of course, not be limited thereto. Other forms of biasing means previously discussed could also be employed with varying degrees of efficiency.

The operation of the present invention may more readily be understood by the recitation, in conjunction with the foregoing, of the assembly procedure. The several steps involved are as follows:

(a) Shaft 40, in this example the output shaft, is held fixed to prevent rotation.

(b) Shaft 86 is rotated in the direction that would tend to load the biasing member. This is done to remove backlash in the resilient gear train comprised of gear set 100, gear 80, pinion 78, gear 72, pinion 70 and gear 44.

(c) Shaft 62 is rotated in the same direction that shaft 86 was rotated in order to eliminate backlash in the conventional gear train comprised of gear 68, pinion 66, gear 60, pinion 58, gear 48, pinion 46 and gear 44.

(d) The input means, in this example pinion 134 of motor 136, is meshingly engaged with gear 104. The pinion 134 is then rotated approximately 60° to load the biasing means. It should be noted at this time that gear 104 is on a higher plane than gear 68. Accordingly, pinion 134 may mesh with gear 104 prior to meshing with gear 68 and the biasing means may be loaded without angularly displacing any elements in the conventional gear train.

(e) The assembly procedure is completed by properly seating the motor so as to meshingly engage pinion 134 with gear 68. Shaft 40 may now be released.

Having thus disclosed the best embodiment of the invention presently contemplated, it is to be understood that various changes and modifications may be made by those skilled in the art without departing from the spirit of the invention.

What is claimed is:

1. An anti-backlash gearing system comprising:
   (a) a first train of gears defined by a plurality of shafts each of which supports at least one rotatable gear, said first train of gears including an input end and an output end;
   (b) a second train of gears defined by a plurality of shafts each of which supports at least one rotatable gear, said second train of gears including an input end and an output end, at least one of said shafts in said second train having a pair of rotatable gears mounted thereon;
   (c) an input gear common to and in meshing engagement with the gear at the input end of said first and second trains of gears;
   (d) an output gear common to and in meshing engagement with the gear at the output end of said first and second trains of gears; and
   (e) a resilient member biasing the gears of said pair of gears in said second train with respect to each other.

2. The apparatus in accordance with claim 1 wherein one of said pair of gears is rigidly secured to said shaft on which it is mounted, the other of said pair of gears being loosely supported on said shaft of said pair of gears, said shaft being rotatable and said pair of gears thereon being angularly movable with respect to each other.

3. The apparatus in accordance with claim 2 wherein said resilient member is a torsion spring having first and second ends, said first spring end being secured to said loosely mounted gear, said second spring end being fixed relative to said shaft supporting said pair of gears in said second train.

4. The apparatus in accordance with claim 2 including anchoring means rigidly secured to said shaft and wherein said resilient member extends between said loosely mounted gear and said anchoring means.

5. The apparatus in accordance with claim 4 wherein said resilient member is a torsion spring having a first end secured to said loosely mounted gear and a second end secured to said anchoring means.

6. An anti-backlash gearing system adapted to be driven by a pinion, said anti-backlash gearing system comprising:
  (a) a first train of gears defined by a plurality of shafts, each of which supports at least one rotatable gear, and including an input gear and an output gear, said input gear being in engagement with the pinion;
  (b) a second train of gears defined by a plurality of shafts, each of which supports at least one rotatable gear, and including an input gear and an output gear, said input gear being in meshing engagement with the pinion, at least one of said shafts in said second train having a pair of rotatable gears mounted thereon;
  (c) an output gear common to and in meshing engagement with the output gears of said first and second train of gears; and
  (d) a resilient member biasing the gears of said pair of gears in said second train with respect to each other.

7. The apparatus in accordance with claim 6 wherein one of said pair of gears is rigidly secured to said shaft on which it is mounted, the other of said pair of gears being loosely supported on said shaft of said pair of gears, said shaft being rotatable and said pair of gears thereon being angularly movable with respect to each other.

8. The apparatus in accordance with claim 7 wherein said resilient member is a torsion spring having first and second ends, said first spring end being secured to said loosely mounted gear, said second spring end being fixed relative to said shaft supporting said pair of gears in said second train.

9. The apparatus in accordance with claim 7 including anchoring means rigidly secured to said shaft and wherein said resilient member extends between said loosely mounted gear and said anchoring means.

10. The apparatus in accordance with claim 9 wherein said resilient member is a torsion spring having a first end secured to said loosely mounted gear and second end secured to said anchoring means.

References Cited

UNITED STATES PATENTS

| 2,920,497 | 1/1960 | Wiken | 74—409 X |
| 3,198,028 | 8/1965 | Dahl et al. | 74—409 |

FOREIGN PATENTS

| 1,033,053 | 4/1953 | France. |

OTHER REFERENCES

Metron Technical Data Sheet No. 7, "Series 7, Anti-Backlash Miniature Speed Changers," Sheet No. 7, February 1952.

Product Engineering, "18 Ways to Control Backlash in Gearing," pp. 71–75, vol. 30, No. 44, Oct. 26, 1959.

FRED C. MATTERN, JR., *Primary Examiner.*

LEONARD H. GERIN, *Assistant Examiner.*